United States Patent
Coenen et al.

(10) Patent No.: US 11,503,416 B2
(45) Date of Patent: Nov. 15, 2022

(54) LOW-LATENCY COMMUNICATION PROTOCOL FOR BINAURAL APPLICATIONS

(71) Applicant: SEMICONDUCTOR COMPONENTS INDUSTRIES, LLC, Phoenix, AZ (US)

(72) Inventors: Ivo Leonardus Coenen, Coffrane (CH); Dennis Wayne Mitchler, Gloucester (CA)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 30 days.

(21) Appl. No.: 17/143,324

(22) Filed: Jan. 7, 2021

(65) Prior Publication Data
US 2022/0217480 A1    Jul. 7, 2022

(51) Int. Cl.
*H04R 25/00*    (2006.01)
*H04B 5/00*    (2006.01)

(52) U.S. Cl.
CPC ......... *H04R 25/554* (2013.01); *H04B 5/0025* (2013.01); *H04R 25/407* (2013.01); *H04R 25/552* (2013.01); *H04R 25/604* (2013.01)

(58) Field of Classification Search
None
See application file for complete search history.

(56) References Cited

U.S. PATENT DOCUMENTS

| 6,141,324 A | 10/2000 | Abbott et al. |
| 2009/0298431 A1 | 12/2009 | Rasmussen |
| 2017/0054763 A1* | 2/2017 | Pedersen ............... H04B 1/715 |

FOREIGN PATENT DOCUMENTS

| EP | 3258707 A1 | 12/2017 |
| WO | 2004110099 A2 | 12/2004 |

OTHER PUBLICATIONS

Spark Microsystems, "Wireless Designed for Audio Streaming," 2020.

* cited by examiner

*Primary Examiner* — Kenny H Truong
(74) *Attorney, Agent, or Firm* — Brake Hughes Bellermann LLP (57) ABSTRACT

Hearing instruments, such as hearing aids, may improve a quality of presented audio through the use of a binaural application, such as beamforming. The binaural application may require communication between the hearing instruments so that audio from a left hearing instrument may be combined with audio from a right hearing instrument. The combining at a hearing instrument can require synchronizing audio sampled locally with sampled audio received from wireless communication. This synchronization may cause a noticeable delay of an output of the binaural application if the latency of the wireless communication is not low (e.g., a few samples of delay). Presented herein is a low-latency communication protocol that communicates packets on a sample-by-sample basis and that compensates for delays caused by overhead protocol data transmitted with the audio data.

12 Claims, 7 Drawing Sheets

LOW-LATENCY COMMUNICATION PROTOCOL FOR BINAURAL APPLICATIONS

FIELD OF THE DISCLOSURE

The present disclosure relates to point-to-point wireless communication and more specifically to a digital wireless communication protocol having low latency to facilitate binaural applications for hearing instruments.

BACKGROUND

Hearing instruments, such as hearing aids or ear-worn speakers (i.e. ear buds), can be worn in/on each ear of a user to provide sound to a user. Additionally, the hearing instruments may include one or more microphones to receive audio signals from an environment of the user. For example, audio from the environment may be received and converted (i.e., sampled) into a first digital signal (i.e., left channel) by a left-worn hearing instrument, and audio from the environment may be received and converted into a second digital signal (i.e., right channel) by a right-worn hearing instrument. Processing to improve a listening/hearing experience for the user is possible if the left channel and the right channel can be processed together (i.e., binaural processing). This binaural processing can require digital communication between the hearing instruments and the synchronization of the left and right channels.

SUMMARY

In at least one aspect, the present disclosure generally describes a method for wireless communication between two devices. The method includes designating a first device as a master and a second device as a slave. The master and the slave communicate data over a frame by transmitting protocol packets from the master to the slave at regular intervals in a first half of the frame and from the slave to the master at regular intervals in a second half of the frame. Each protocol packet transmitted add a latency to the wireless communication. Accordingly, the method further includes transmitting data packets during the regular intervals between the protocol packets. The data packets are transmitted between the master and the slave in an alternating fashion. The data packets have a number of bits that is smaller than a number of bits of the protocol packets so that the latency added by each protocol packet is compensated for by the data packets transmitted between the protocol packets.

In another aspect, the present disclosure generally describes a hearing instrument system. The hearing instrument system includes a first hearing instrument that is designated as master and that is configured to be worn at a first ear of a user. The first hearing instrument includes a first microphone, a first speaker, a first transceiver configured for wireless communication, and a first processor configured to execute software instructions stored in a first memory. When executed, the software instructions cause the first processor to transmit a first channel of audio samples collected at the first microphone in packets that each contain one audio sample so that the packets are transmitted as each audio sample is collected. The hearing instrument system further includes a second hearing instrument that is designated as slave and that is configured to be worn at a second ear of the user. The second hearing instrument includes a second microphone, a second speaker, a second transceiver configured for wireless communication, and a second processor configured to execute software instructions stored in a second memory. When executed, the software instructions cause the second processor to transmit a second channel of audio samples collected at the second microphone in packets that each contain one audio sample so that the packets are transmitted as each audio sample is collected. The second processor is further caused to receive the first channel of audio samples collected at the first microphone, combine the first channel and the second channel for a binaural application, and couple an output of the binaural application to the second speaker.

In another aspect, the present disclosure generally describes a non-transitory computer-readable medium that includes instructions stored thereon that when executed by a processor of the first hearing instrument, cause the first hearing instrument to perform operations. The operations include transmitting a preamble packet to a second hearing instrument, where the transmission of the preamble packet causes a first delay corresponding to a time taken to transmit preamble data of the preamble packet. The operations further includes transmitting, after the preamble packet, a number of data packets at a rate that compensates for the first delay. The operations further include transmitting a message packet to the second hearing instrument, wherein the transmission of the message packet causes a second delay corresponding to a time taken to transmit message data of the message packet. The operations further include transmitting, after the message packet, a number of data packets at a rate that compensates for the second delay. The operations further include transmitting a cyclic redundancy check (CRC) packet to the second hearing instrument, where the transmission of the CRC packet causes a third delay corresponding to a time taken to transmit CRC data of the CRC packet. The operations further include transmitting, after the CRC packet, a number of data packets at a rate that compensates for the third delay.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Binaural processing can improve a listening/hearing experience for a user by processing audio received at different hearing instruments (e.g., worn at each ear of the user) For example, a user that is deaf in one ear may hear a combined left/right audio channel in the hearing ear so that sounds on the side of the user's deaf ear may be heard more easily. In another example, a user may receive audio with reduced noise, using a binaural processing technique known as beamforming. Binaural processing may require wireless digital communication of sound data between a left hearing instrument and a right hearing instrument and the synchronization of the sound data prior to processing. Conventional radio frequency (RF) digital communication protocols (e.g., Bluetooth, WiFi) can introduce a communication delay (i.e. transport delay, latency) that can negatively affect the binaural processing. Disclosed herein are circuits and methods to improve the wireless digital communication and synchronization of audio data to facilitate binaural processing, such as beamforming.

Beamforming may be performed on audio from two spatially separated microphones on a single hearing instrument (i.e., monaural beamforming); however, beamforming performed on audio from microphones on a left hearing instrument at a left ear of the user and a right hearing instrument at a right ear of the user (i.e., binaural beamforming) may offer some advantages. For example, the audio from the left and right hearing instruments may have an interaural delay and amplitude difference resulting from the separation between the left/right ears and a direction of the sound, which can improve a quality the beamforming.

Figure 1:
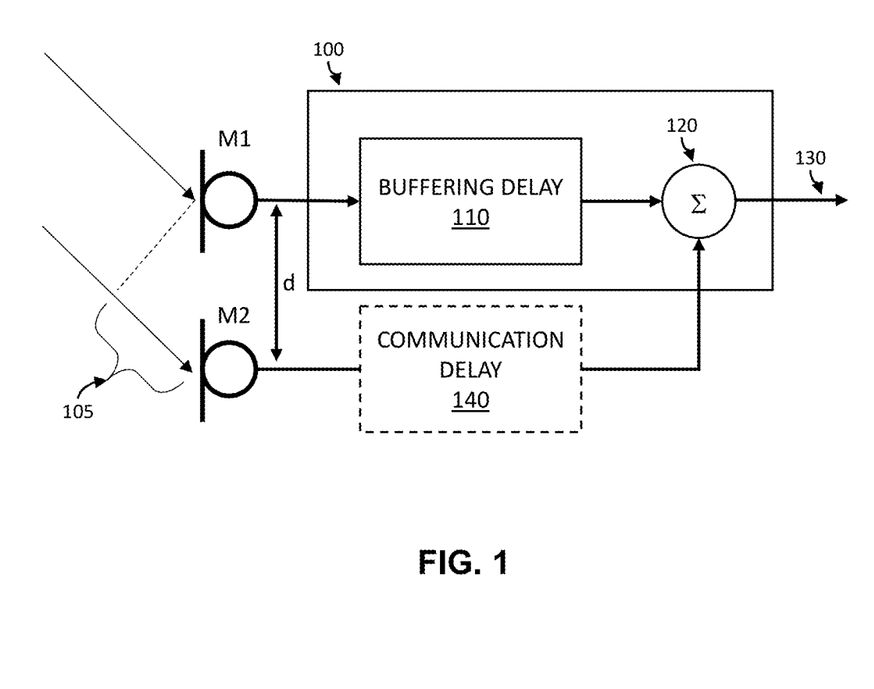
FIG. 1 is a schematic block diagram illustrating a beam forming process according to an implementation of the present disclosure.

FIG. 1 is a schematic block diagram illustrating an example beam forming process. The example beamforming process is simplified for understanding. Variations to the example beamforming process are possible and within the scope of the present disclosure. For example, a number, an arrangement (e.g., spatial separation), and a response (e.g., amplitude) of the microphones may be adjusted to suit a particular application/environment.

As shown in FIG. 1, a first microphone (M1) and a second microphone (M2) are spatially separated by a distance (d). The spatial separation distance (d) and the direction of the sound introduce an interaural delay 105 between a first time at which a sound arrives at the first microphone (M1) and a second time at which the sound arrives at the second microphone (M2). The beamforming processing 100 includes a buffering delay 110 applied to one of the audio streams (e.g., the audio from the first microphone (M1)). The buffering delay 110 can be used to synchronize the audio streams and/or create a delay between the audio streams for beamforming. The beamforming processing further includes a combiner 120 that is configured to combine (e.g., sum) the audio streams into a beamformed audio stream 130. By adjusting the buffering delay 110 (e.g., with respect to the interaural delay 105), audio from a particular direction may be adjusted (e.g., cancelled, attenuated, enhanced) by the beamforming process. For example, a pure sine wave received by M1 and M2 can be canceled completely for a particular direction if, after the interaural delay 105 and the buffering delay 110, the versions of the sine wave at the combiner 120 are 180 degrees out of phase.

A quality of an audio adjustment (i.e., cancellation, attenuation, enhancement) resulting from beamforming can depend on the matching performance of the first microphone (M1) and the second microphone (M2). Additionally, a spatial profile (i.e., directivity) of the beamforming may be affected by the spatial separation (d) of the first microphone (M1) and the second microphone (M2). A small spatial separation (d) can produce an interaural delay 105 that changes little (if at all) with a direction of the sound. As the spatial separation (d) of the microphones is made larger, a spatial filtering that is possible from the beamforming may be increased. Accordingly, it may be desirable to position the first microphone (M1) at a left ear of a user and the second microphone (M2) at a right ear of the user (or vice versa). This positioning may also add realism to the beamforming by preserving the amplitudes and phases of audio streams as they normally appear at each ear of the user.

A relatively large spatial separation (d) can require sound data from one of the microphones to be transmitted to the other. Referring to FIG. 1, if the beamforming processing 100 is local to the first microphone (M1) (e.g., included in a left hearing instrument), then sound data from the second microphone (M2) (e.g., from a right hearing instrument) can be transmitted to the beamforming processing 100. Wireless communication of the sound data may be desirable in many applications (e.g., in hearing instruments) but can introduce a communication delay 140 (i.e., latency) to the beamforming shown in FIG. 1.

As mentioned, a conventional wireless communication protocol may result in a communication delay 140 that is relatively large. Increasing the buffering delay 110 to compensate for the communication delay 140, however, may reduce a quality of the beamforming (i.e., may reduce a listening/hearing experience for a user). For example, a communication delay can result in a beamformed audio stream 130 that is visually out of sync with a sound source (especially for high frequency sounds) due to a buffering delay necessary to compensate for the communication delay 140.

The disclosed circuits and methods describe a wireless communication system that includes a communication protocol that minimizes a communication delay (i.e., provides an ultra-low latency) to allow for improved performance in binaural applications, such as beamforming. Additionally, the communication protocol can utilize wireless communication technology that is well suited for body-worn hearing instruments.

Conventional digital wireless communication can include transmitting propagating radio frequency (RF) signals (e.g., 2.4 gigahertz (GHz)) between a transmitter antenna and a receiver antenna. For conventional digital wireless communication, such as Bluetooth and WiFi, the RF signals are intended to propagate according to far-field transmission principles. Communicating between hearing instruments worn in opposite ears using these forms of digital wireless communication could result in (at least) poor efficiency and interference with other devices. To avoid these problems, the disclosed circuits and methods can use a near field magnetic induction (NFMI) communication technology, which is better suited for wireless communication between body worn devices, such as hearing instruments.

Figure 2:
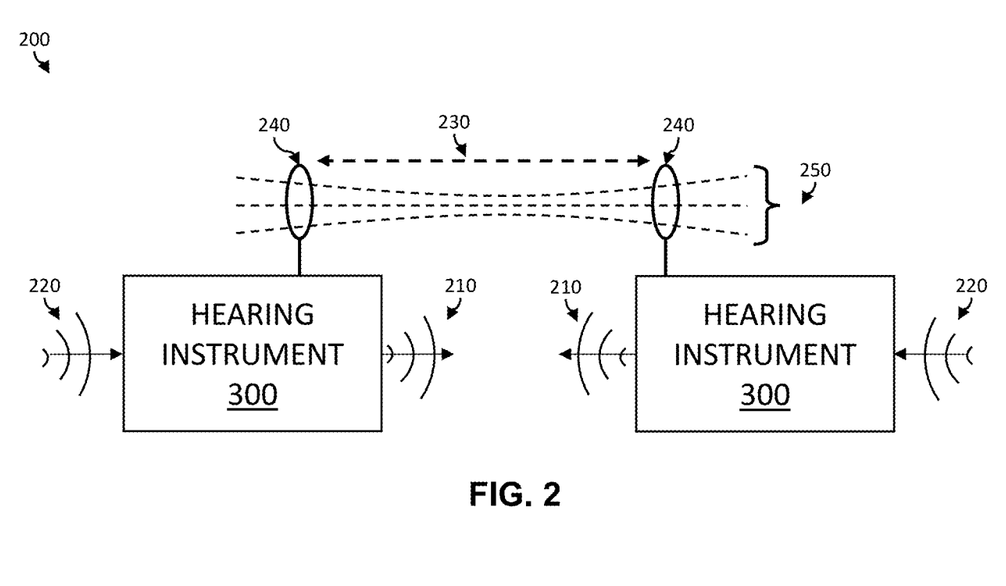
FIG. 2 illustrates a block diagram of a binaural sound system including hearing instruments communicating via near field magnetic induction (NFMI) according to a possible implementation of the present disclosure.

FIG. 2 illustrates a block diagram of a binaural sound system including hearing instruments communicating via NFMI according to a possible implementation of the present disclosure. The binaural sound system 200 includes two hearing instruments. Each hearing instrument 300 can be configured to be worn near or touching an ear of a user. For example, in a possible implementation, the hearing instruments are a left hearing instrument and a right hearing instrument worn (at least partially) in an ear canal of the user. Each hearing instrument 300 can include one or more speakers for projecting transmitted sounds 210 (e.g., beamformed audio stream) from the hearing instrument. Each hearing instrument 300 can also include one or more microphones for receiving received sounds 220 from an environment. Each hearing instrument 300 may also include a transmitter and/or a receiver. For example, each hearing instrument 300 may include a transmitter/receiver (T/R) configured to transmit and receive digital data over a wireless communication link 230 (e.g., a bidirectional wireless communication link). As mentioned previously, the wireless communication link 230 may include NFMI.

NFMI facilitates digital communication over a short range (e.g., <1 meter(m)). For NFMI communication, each hearing instrument 300 can include a coil 240 that is coupled to a transmitter/receiver of the hearing instrument 300. The transmitter of a first hearing instrument can be configured to excite a current in a coil 240 of the transmitter to produce a magnetic field 250 that is inductively coupled to a coil 240 of a receiver of a second hearing instrument. The magnetic field 250 may be modulated (e.g., frequency shift key (FSK)) for communicating digital information between the hearing instruments. The coils may be substantially similar (e.g., identical) and can be arranged to increase a magnetic coupling so that the efficiency of NFMI can be high. Further, magnetic field 250 can be tightly coupled and has an amplitude that drops quickly with range because it does not propagate (i.e., near field transmission). Accordingly, NFMI communication can minimize interference with other devices. For digital communication, the magnetic field 250 may be modulated in a high-frequency (HF) band (e.g., 10-14 megahertz (MHz)). HF band signals may experience less distortion/absorption from the human body than higher frequency signals (e.g., 2.4 GHz).

Figure 3:
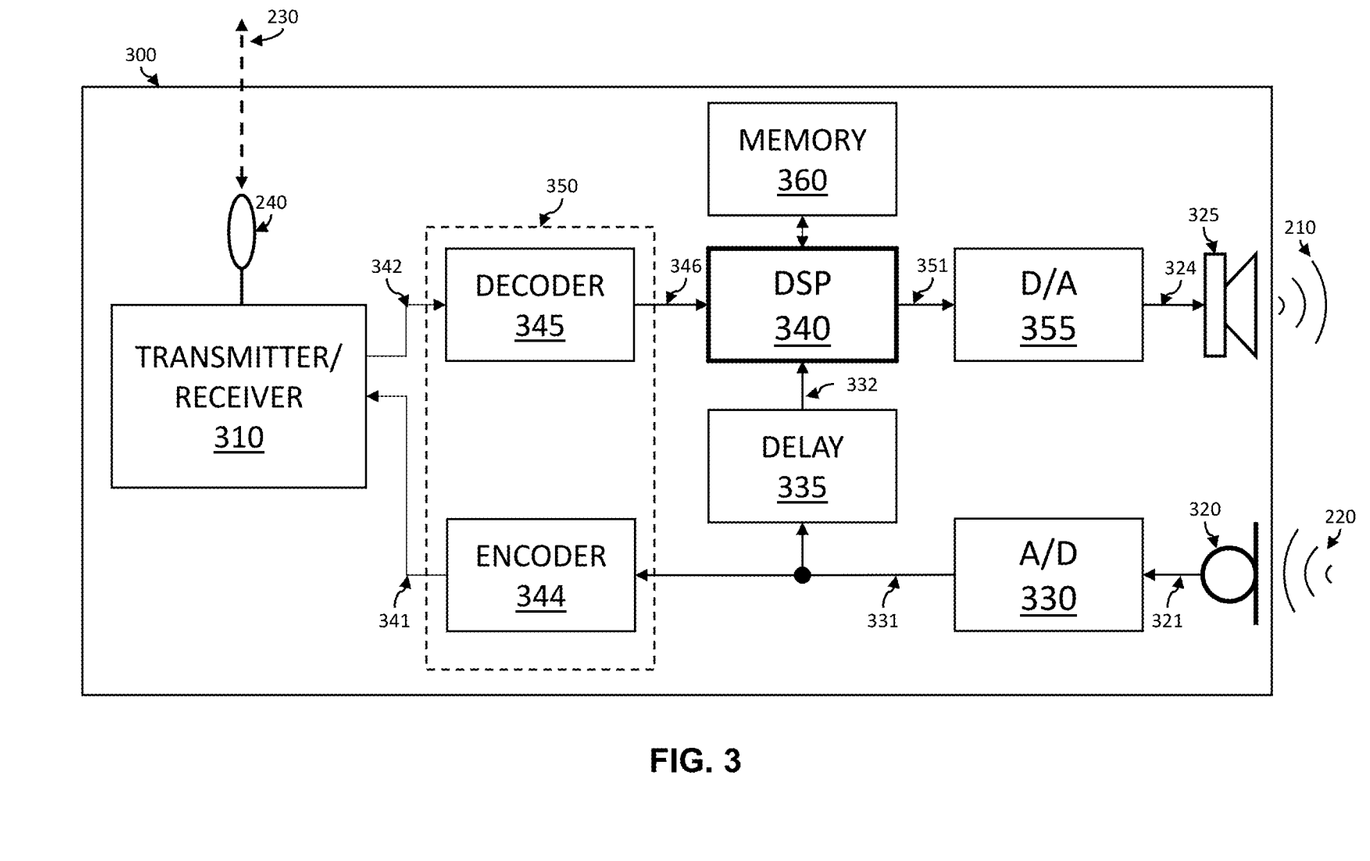
FIG. 3 illustrates a block diagram of a hearing instrument according to a possible implementation of the present disclosure.

FIG. 3 illustrates a block diagram of a hearing instrument 300 that can be used in the binaural sound system of FIG. 2. As mentioned previously, the hearing instrument can include a transmitter/receiver coupled to a wireless transducer, such as an antenna or a coil. The transmitter/receiver may be implemented as a discrete transmitter and receiver or may be implemented as a transmitter/receiver device that includes a transmitter portion and receiver portion. For the hearing instrument implementation shown in FIG. 3, a transmitter/receiver 310 (i.e., transceiver) may transmit and receive digital data (e.g., an audio data stream) over a wireless communication link 230 via a coil 240 configured for NFMI.

The hearing instrument 300 includes at least one microphone 320 (i.e., mic) configured to convert received sounds 220 into an analog mic signal 321. The analog mic signal 321 is coupled to an analog-to-digital converter (i.e., A/D 330) that is configured to periodically sample (i.e., samples spaced by a sampling period) the analog mic signal 321 at a sample rate (e.g., 24 kilohertz (kHz)), generate digital samples having a amplitude resolution corresponding to a binary representation (e.g., 16 bits), and output the digital samples in sequence as a digital data stream 331. The digital data stream 331 may be transmitted to a processor (e.g., a digital signal processor (i.e., DSP 340), which can be configured to use the digital data stream 331 as a channel in a binaural application, such as beamforming. In a possible implementation, the hearing instrument can include a delay 335 (e.g., buffering delay 110) that is configured to generate a buffered digital data stream 332, which is buffered for a period before being provided to the DSP 340. The delay 335 may be used to synchronize data streams (e.g., local and received) at the DSP 340 and may also be used for binaural applications (e.g., beamforming). The digital data stream 331 may also be provided to an encoder 344 that is configured to encode (e.g., compress) the digital data stream in order to reduce a number of bits (i.e., bandwidth) communicated over the wireless communication link 230. The encoder 344 may be a portion of an audio codec 350 that includes (at least) an encoder 344 and a decoder 345. The audio codec 350 may be one of a plurality of possible types, including (but not limited to) an adaptive differential pulse-code modulation (ADPCM) codec. The encoder 344 may output an encoded data stream 341 for transmission to a transmitter portion of the transmitter/receiver 310 for transmission to another hearing instrument (not shown).

The transmitter/receiver 310 may further include a receiver portion that is configured to receive an encoded data stream from another hearing instrument (not shown) over the wireless communication link 230 via the coil 240. The receiver portion may couple the received encoded data stream 342 to the decoder 345. The decoder 345 can be configured to decode (e.g., decompress) the received encoded data stream and output a received digital data stream 346 to the DSP 340.

The DSP 340 may be configured to receive/process the digital data stream 331 (i.e., first channel, local channel) and the received digital data stream 346 (i.e., second channel, remote channel, received channel) for a binaural application and to output a processed digital data stream 351. The processed digital data stream 351 can be a combination of the digital data stream 331 and the received digital data stream 346. In a possible implementation, the DSP 340 is configured (e.g., by software) to perform beamforming processing on the first channel and the second channel. In this case, the processed digital data stream 351 is the beamformed audio stream 130.

The hearing instrument 300 may further include a non-transitory computer readable medium (i.e., memory 360). The memory 360 may be configured to store a computer program product (i.e., software) including instructions that, when executed by a processor, can configure the processor to perform operations to enable functionality of the hearing instrument. For example, the memory 360 may include stored instructions that can configured the DSP 340 to perform a beamforming process (i.e., method). Additionally, or alternatively, the memory may include stored instructions that can configure a processor (e.g., the DSP 340) to perform a method associated with an ultra-low latency NFMI communication protocol.

The hearing instrument 300 may further include a digital-to-analog converter (i.e., D/A 355) that is configured to parse the digital samples of the processed digital data stream 351 and to generate an analog speaker signal 324 based on the digital samples. The analog speaker signal 324 can be amplified (not shown) and coupled to at least one speaker 325 of the hearing instrument 300 to produce transmitted sounds 210. The transmitted sounds 210 may provide an improved listening/hearing experience for a user because of the binaural application. For example, the transmitted sounds may include less noise than transmitted sounds without the processing provided by the binaural application.

As mentioned, the hearing instrument 300 shown in FIG. 3 can be one of two hearing instruments worn in the ears of a user. In this case, the hearing instrument worn in the left ear can be the same as the hearing aid worn in the right ear.

In other words, processing may be performed at each hearing instrument. Alternatively, a first hearing instrument in a pair can include a subset of the circuits/subsystems as a second hearing instrument in the pair. In other words, processing for a binaural application may be performed at one hearing instrument in the pair. In either case, a wireless communication link 230 between the hearing instrument may be required. The wireless communication link 230 may include a low-latency communication protocol in order to prevent problems in the processing for the binaural application.

Figure 4:
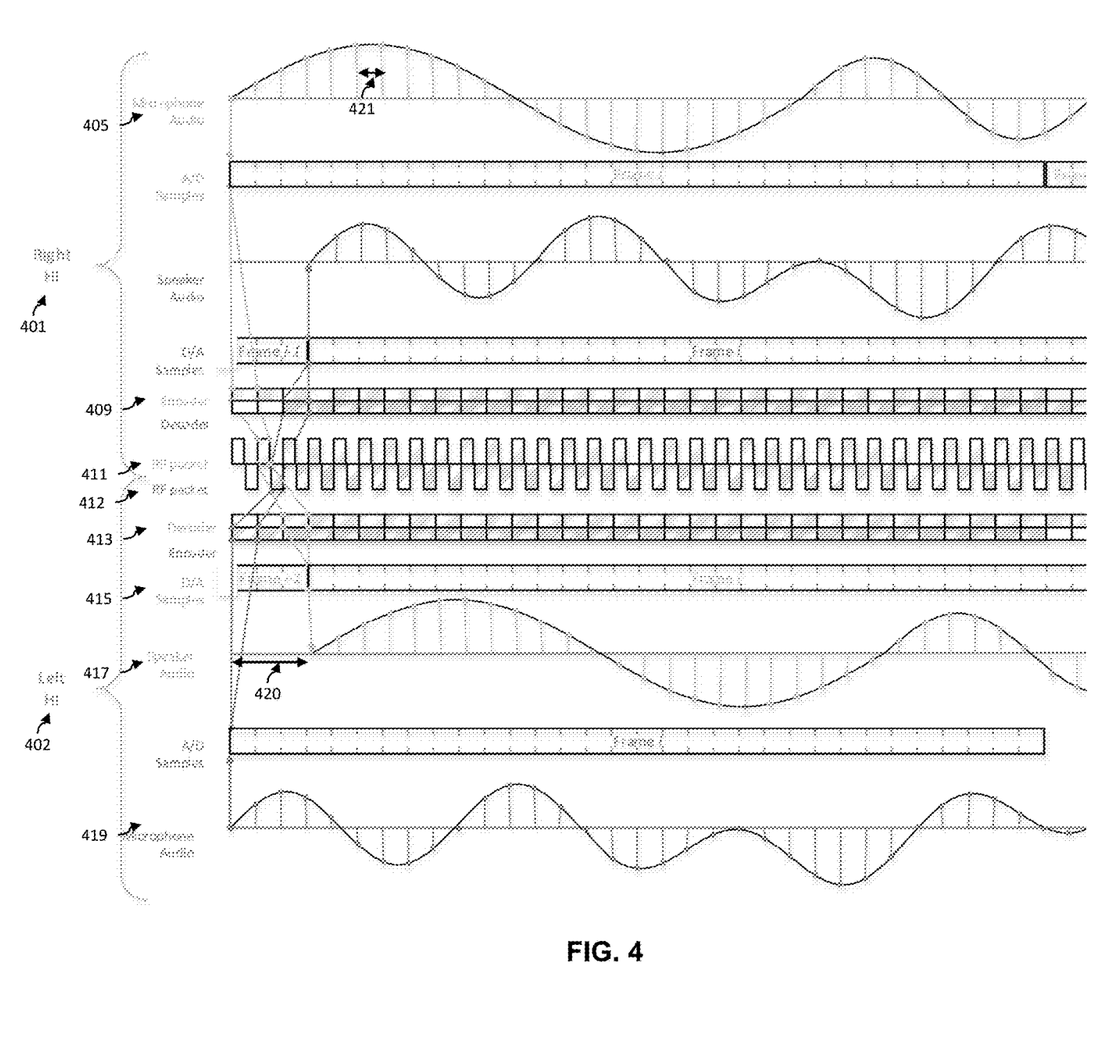
FIG. 4 illustrates timing diagrams of a low-latency communication protocol according to a possible implementation of the present disclosure.

FIG. 4 illustrates timing diagrams of a low-latency communication protocol according to a possible implementation of the present disclosure. In a forward direction (i.e., right HI to left HI), the microphone A/D samples are processed immediately by a codec and channel encoder on a per sample basis. The encoded data is then formatted into small packets representing one sample each and transmitted over the air at a high data rate. Next, the left HI receives the transmitted signal and decodes the demodulated packet. The demodulated data is decoded sample-by-sample to generate the D/A samples. The D/A samples are converted to analog audio for the left's speaker. The communication delay in the example is 3 sample periods, which is 125 microseconds for 24 kHz sample rate. In other words, the latency of the communication is only a few sample periods and is mostly due to the encoding/decoding.

FIG. 4 includes a plurality of graphs of signals plotted versus the same time axis. The plurality of graphs may be grouped by hearing instrument. The graphs include graphs for a first hearing instrument (e.g., a right hearing instrument 401). The graphs also include graphs for a second hearing instrument (e.g., a left hearing instrument 402). The graphs illustrate the timing associated with bidirectional communication of audio between the left hearing instrument (left HI) and the right hearing instrument (right HI) to provide a visual understanding of a communication delay (i.e. latency). The timing can be expressed in terms of a sampling time (i.e., sampling period) (e.g., 41.67 microseconds (µs)/sample) for the audio signals, which is typically the same for each hearing instrument.

At the right hearing instrument, microphone audio is sampled to create a right audio data stream that includes a plurality of audio samples. In a conventional communication protocol (e.g., Bluetooth, WiFi), a number of samples are collected to form a block that can be encoded and transmitted in a packet. When an amount of overhead data is required for each packet (e.g., as in Bluetooth, WiFi), an efficiency of the packet communication can be increased by increasing a size of the block. Additionally, an encoder may work better for large blocks of data. In other words, an amount of compression of a block of data may increase as a size (i.e., length) of the block of data is increased.

While larger blocks may be desirable for conventional communication, they can lead to larger communication delays (i.e., transport delays, latencies). For example, transmitting a block of data from a first device to a second device results in a communication delay that includes a transmission delay and a reception delay. The transmission delay can include a first delay associated with collecting the data samples for a block of data at the first device, a second delay associated with encoding the block of data, and a third delay associated with transmitting the encoded block of data wirelessly. Receiving the block of data can result in a reception delay that includes a fourth delay associated with receiving the encoded block of data, a fifth delay associated with decoding the block of data, and a sixth delay associated with presenting audio from the block of data at the second device.

When the block of data is large, a communication delay, resulting from a conventional protocol, can be too large for a binaural application. A binaural application using a first stream of audio data collected locally and a second stream of audio data received from a remote device may require the synchronization of the streams of audio data. Buffering the stream of audio data collected locally during the communication delay in order to synchronize it with the audio data collected remotely may result in a delayed output of the processed digital data stream (i.e., the transmitted sound). This delay may be made even more severe if a packet is damaged or lost. In hearing instruments (e.g., hearing aids), large delays (e.g., ≥10 milliseconds(msec)) may be unacceptable because sounds may become noticeably out of sync with their visually observable sources (i.e., counterparts). Accordingly, the disclosed communication protocol can minimize a block size (e.g., ≤2 samples). For example, as shown in FIG. 4 the block size is one sample. To prevent the loss of efficiency associated with a small block, the disclosed communication protocol eliminates the overhead data transmitted with each block. Instead, the disclosed communication protocol distributes the overhead data (e.g., messaging, error correction, synchronization, etc.) throughout a frame of samples to manage the communication and eliminate errors.

As shown in FIG. 4, microphone audio 405 collected from a microphone at a right HI may be sampled to produce a sequence of A/D samples. Each A/D sample may be represented by a number of bits (e.g., 16 bits). The bits for each sample may be encoded by an encoder 409 to produce an encoded block for a packet. The packet may be transmitted using a wireless technology (e.g., NFMI) to a left HI 402. At the left HI, the packet is decoded by a decoder 413 and converted into D/A samples 415 so that received audio 417 from the right HI 401 is reconstructed at the left HI 402. Because the block of data in the packet is limited to a sample, a delay 420 between a time at which audio was sampled by the right HI 401 and a time at which the sample becomes available at the left HI 402 is small (e.g., about 3 samples). Accordingly, synchronizing audio captured at the left HI 402 (i.e., left microphone audio 419) with audio received from the right HI (i.e., left speaker audio 417) requires a short delay (e.g., ~125 µs). The left HI 402 may also collect and transmit audio to the right HI as described above.

The left HI 402 and the right HI 401 can transmit packets at the same rate but at different times so that packets 411 transmitted by the right HI 401 (i.e., downlink packets) do not overlap with packets 412 transmitted by the left HI 402 (i.e., uplink packets). To achieve non-overlapping packets, the right HI and the left HI can synchronize using communicated messages that includes predetermined data (e.g., sync word). For example, prior to data transmission a master device (e.g., the right HI) may repeatedly transmit a short (e.g., 16 bit) sync word to a slave device (e.g., the left HI). Because the sync word is known to the slave device, adjustments may be made to the sync device until the sync word is recognized at the slave device.

The left HI 402 may not always receive packets from the right HI 401 correctly (and vice versa). To correct for communication errors, each packet may include parity bits that can help the receiving device to determine if the data in a packet is correct or incorrect. The parity bit analysis may determine if correction is possible. If correction is possible, then the data bits in the packet can be changed to correct the errors. If correction is not possible, the code may apply an algorithm (e.g., packet loss concealment) to mitigate the information lost by the error.

For at least synchronization and error correction some overhead information may be communicated in addition to the audio data. An advantage of the low-latency communication protocol disclosed is that this overhead information may be transmitted without significantly affecting the packet-to-packet delay. For example, messages regarding the communication may be transmitted on a frame-by-frame basis where a frame includes a number (e.g., 128) of packets. Delays (i.e. latencies) caused by the messages may be counter balanced by an increased packet transmission rate so that a latency caused by the overhead information is insignificant (e.g., zero). The protocol and its features may be best understood by considering an example frame.

Figure 5:
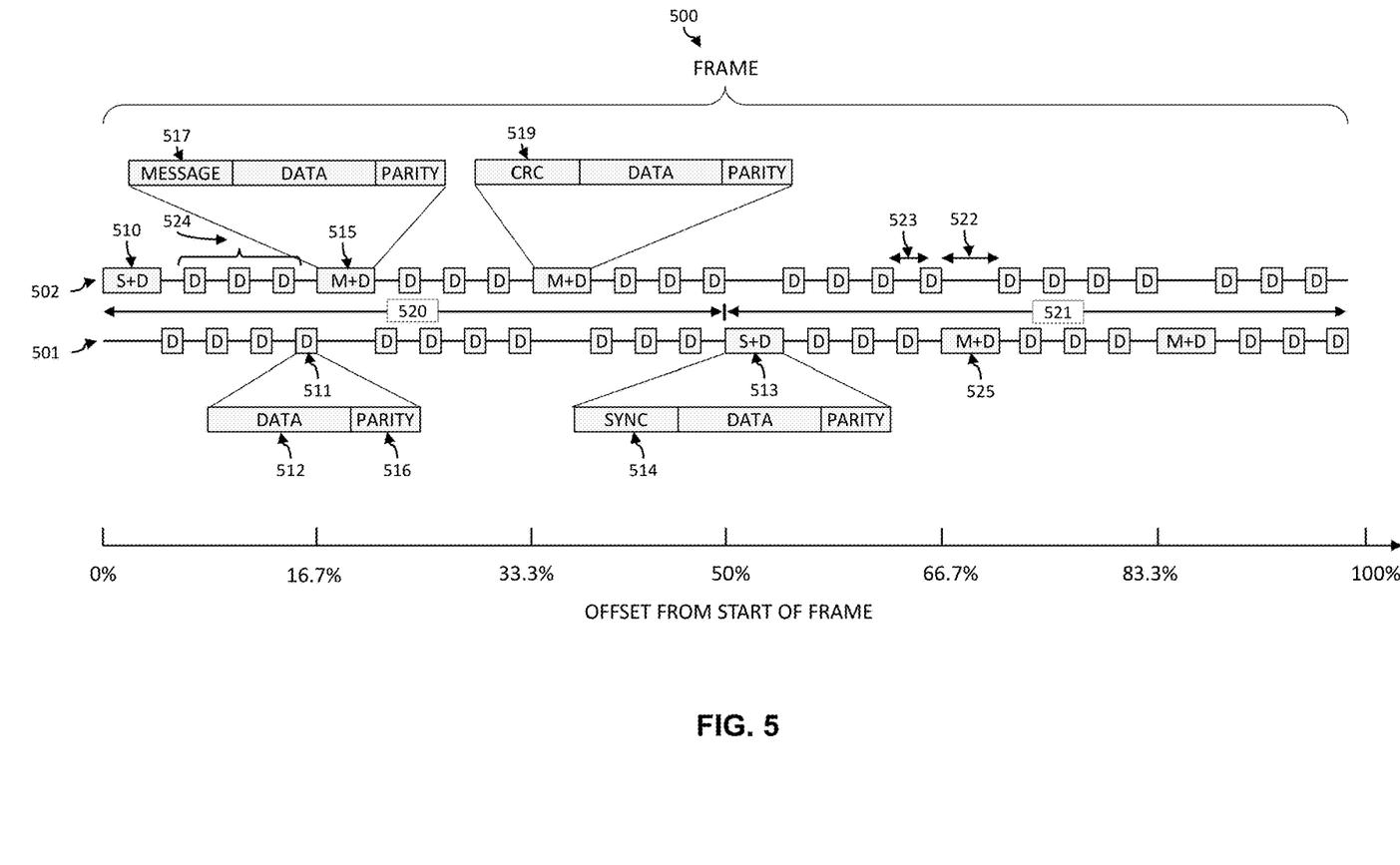
FIG. 5 illustrates a frame of uplink and downlink data streams according to a possible implementation of a low-latency communication protocol according to an implementation of the present disclosure.

FIG. 5 illustrates a frame 500 including an uplink data stream 501 (e.g., transmitted by a device designated slave) and downlink data stream 502 (e.g., transmitted by a device designated master) according to a possible implementation of a low-latency communication protocol. The low-latency communication protocol (i.e., protocol) includes a plurality of frames transmitted in sequence. Each frame can be identical and arranged as the frame 500 shown. Accordingly, the frame 500 may include an identically arranged frame just prior to the frame shown and immediately after the frame shown. The frame includes a plurality of packets. In each frame, the uplink data stream 501 and the downlink data stream 502 can alternate transmitting packets. A number of packets transmitted in the uplink data stream 501 during the frame 500 may equal a number of packets transmitted in the downlink data stream 502 during the frame 500. Each packet in data stream may include a block of audio data 512 (i.e., DATA). As mentioned, the audio data in each packet may correspond to bits of one sample of an analog audio signal. Each packet may further include parity bits 516 (i.e., PARITY) added by an encoder 344 to help diagnose and correct for bit errors in audio data resulting from the wireless communication. Accordingly, data packets (D) can be arranged so that the parity bits are transmitted after the audio bits. In other words, a data packet 511 (i.e., D) can include (in sequence) payload (e.g., audio data (i.e., DATA)) and parity data (i.e., PARITY). In a frame 500, the downlink transmitter and the uplink transmitter take turns transmitting data packets. For the uplink and downlink transmission to use the same frequency band, time synchronization between the data streams may be necessary. This initial time synchronization may happen at the beginning of communication, during a synchronization period (i.e., start-up mode). The frame of FIG. 5 shows the relative timing of packet transmission after synchronization (i.e., after a start-up mode of communication)

A data packet 511 may be a sample of audio data (e.g., 16 bits) that has been compressed by a codec (e.g., ADPCM) to a short data length (e.g., 8 bits). The parity may be shorter than the compressed audio sample (e.g., 4 bits). The parity may be used to detect, and in some cases, correct for errors. The disclosed low-latency communication protocol utilizes parity with each audio data in a packet so that there is no time necessary for the resending of packets with errors. Each packet is short so even if an error cannot be corrected or a packet is lost the effect on the overall data stream may not be significant.

Some packets in the uplink data stream 501 and the downlink data stream 502 can further include overhead data (i.e., protocol data) added to the data packet (D) (i.e., added to the audio data and the parity data). For example, a sync packet 513 (i.e., S+D) can include (in sequence) synchronization data 514 (i.e., SYNC), audio data (i.e., DATA), and parity data (i.e., PARITY). A message packet 515 (i.e., M+D) can include (in sequence) message data (i.e., MESSAGE), audio data (i.e., DATA) and parity data (i.e., PARITY).

The synchronization data 514 may be short (e.g., 16 bits) to prevent the synchronization data (S) added to the data packet (D) from significantly delaying the data stream. The synchronization data 514 may include a sync word that a receiver can use for synchronization. In other words, during a synchronization period a receiver may expect to receive a sync word. A transmitter may repeatedly transmit the sync word and the receiver may adjust itself until the repeated sync word is received properly, at which point the transmitter and the receiver are synchronized. The sync word can be relatively short, which can increase a risk that random data is recognized as the sync word. To mitigate this risk, the receiver may be configured to detect correct reception of the sync word for multiple frames.

The message data 517 may be short (e.g., 16 bits) to prevent the message data (M) added to the data packet (D) from significantly delaying the data stream. The message data 517 may include information regarding the communication, such as number of packets, packet number, length of message, and acknowledgment of last message received.

In some cases, the message data is cyclic redundancy check data (i.e., CRC data). In this case, a message packet (M+D) can include (in sequence) CRC data 519 (CRC), audio data (i.e., DATA), and parity data (i.e., PARITY). The CRC data 519 may be short (e.g., 16 bits) to prevent the CRC data (CRC) added to the data packet (D) from significantly delaying the data stream. The CRC data 519 may include information to help detect errors in a previously sent message data (M). When the message packet includes CRC data it may be referred to as a CRC packet.

The message packets (M+D) and the sync packets (S+D) may be referred to collectively as protocol packets. The protocol packets may be the same size or different sizes and may be generally larger than the data packet 511 by a number of bits for the overhead data (i.e., protocol data). The protocol packets can be transmitted at intervals (i.e., regular intervals) in a frame (i.e., can be distributed in the frame). In other words, the protocol packets can be spaced apart by a plurality of data packets (D), such as shown in FIG. 5.

Data packets may be transmitted at a data packet rate when not otherwise delayed by a protocol packet. In other words, most data packets in the frame may be separated by a data packet period 523. When a protocol packet 525 is transmitted, data packets around the protocol packet may be separated by a delayed packet period 522. In other words, each delayed packet period in a frame can contribute to a communication delay of the frame. The low-latency communication protocol disclosed can reduce (e.g., eliminate) the communication delay by adjusting the data packet period 523 to compensate for the delayed packet period 522.

As mentioned, each data packet may include one sample of audio data. In this case, a communication delay 140 may be minimized when the samples of audio data are transmitted, on average, at the sampling rate of the audio data. The disclosed low-latency communication protocol maintains an average transmission rate by transmitting data packets at data packet period 523 that is faster than an audio sampling period 421 (i.e., sample period) so that after a delayed packet period 522 the average packet period is the sampling period 421. In other words, the data packet rate (i.e., data packet period) can compensate for a delay caused by a protocol packet (i.e., delayed packet period). Proper spacing of the protocol packets in the frame may be necessary to keep the average communication delay at its minimum.

The transmitters of the uplink data stream 501 and the downlink data stream 502 may each transmit protocol packets. For example, the downlink data stream 502 may include a preamble packet, a message packet, and a message packet containing CRC in each frame 500. Likewise, the uplink data stream 501 may include a preamble packet, a message packet, and a message packet containing CRC in each frame 500. The frame 500 may be divided into a first portion 520 (e.g., first half) and a second portion 521 (e.g., second half) at a 50% offset point from the frame start. In a possible implementation, half (50%) of the data packets for the frame are transmitted in the first portion and half (50%) of the data packets for the frame are transmitted in the second portion. The transmitter of the downlink data stream 502 may transmit all of its protocol packets in the first portion 520 of the frame 500, while the transmitter of the uplink data stream 501 may transmit all of its protocol packets in the second portion 521 of the frame 500.

The protocol packets are distributed (e.g., equally) within the frame. For example, as shown in FIG. 5, the downlink data stream and the uplink data stream may together include six protocol packets (i.e., three in uplink data stream 501 and three in downlink data stream 502). In one possible implementation, the downlink data stream 502 (e.g., transmitted by a master HI) can include a sync packet (S+D) at the start of the frame (i.e., 0% offset from the start), a first message packet (M+D) at a 16.7% offset from the start, and a second message packet (M+D) (i.e., CRC packet) at a 33.3% offset from the start. The uplink data stream 501 (e.g., transmitted by a slave HI) can include a sync packet (S+D) at 50% offset from the start, a first message packet (M+D) at a 66.7% offset from the start, and a second message packet (M+D) (i.e., CRC packet) at 83.3% offset from the start. In other words, after the message packet (M+D) at 33.3% offset from the start, the downlink data stream 502 includes only data packets, while before the sync packet (S+D) at 50% offset from the start, the uplink data stream includes only data packets. At 100% offset from the start the sync packet (i.e., preamble packet, header) packet) can be sent in the downlink data stream 502 for the next frame. In other words, a preamble packet may be sent by the master transmitter once every N samples, where N is a number of data packets in a frame. It should be noted that the sync packet and the message packets (i.e., the protocol packets) transmitted in the downlink data stream 502 (e.g., by the master) may not be the same as the sync packet and the message packets transmitted in the uplink data steam 501 (e.g., by the slave).

The protocol packets are spread in the frame to minimize a communication delay. For example, the sync packet 510 at 0% offset introduces a delay (i.e., latency) relative to a sample rate. The subsequent message packet 515 may not transmitted until the delay can be compensated for by data packets transmitted after the sync packet. For example, the data packets can be transmitted at a packet transmission rate that is higher than the sample rate. In other words, the delay compensation can be divided over a plurality of data packets 524 between the sync packet 510 and the message packet 515. Accordingly, the rate of data packet transmission may need to be only a fraction higher than the sampling rate of the audio signal.

Figure 6:
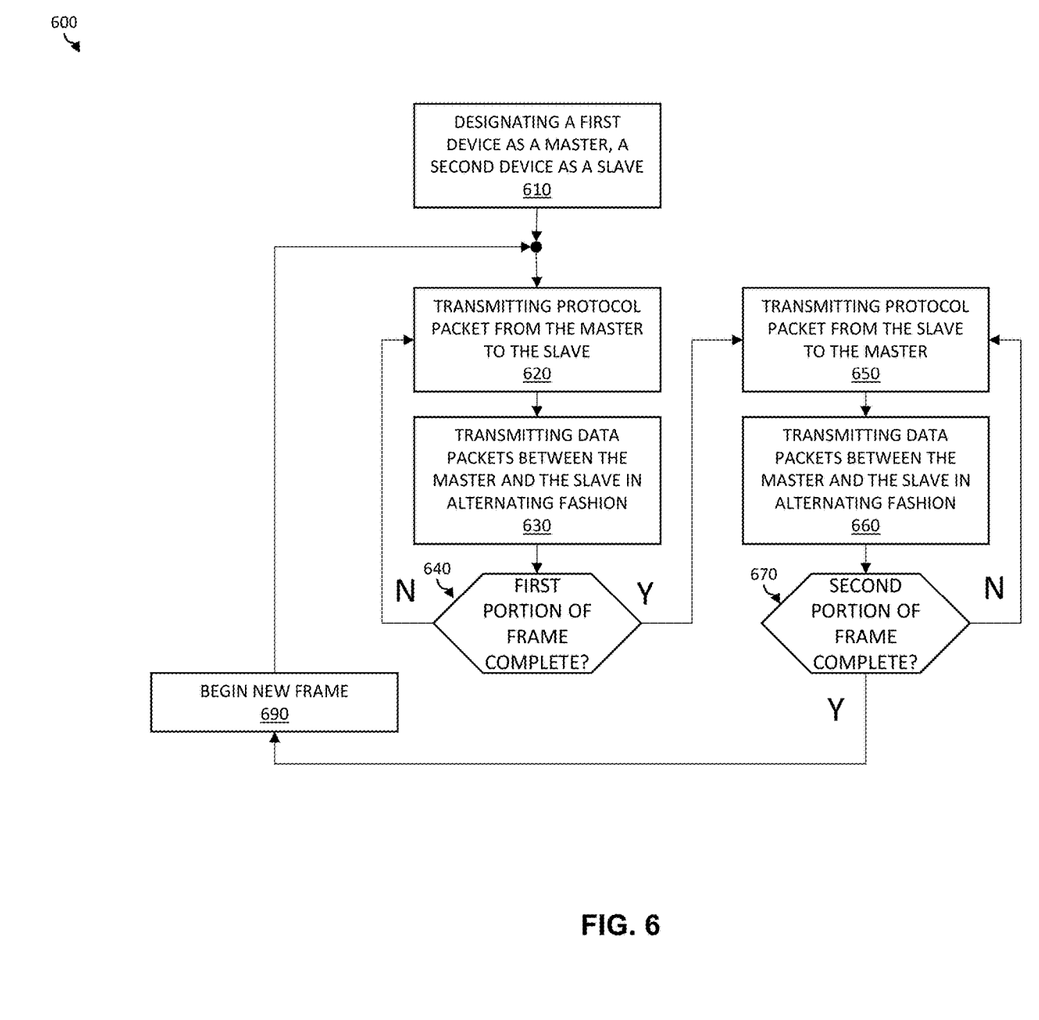
FIG. 6 is a flow chart of a method for wireless communication according to a possible implementation of the present disclosure.

FIG. 6 is a flow chart of a method for low-latency wireless communication between two devices (e.g., hearing instruments). According to a possible implementation, the method 600 includes designating 610 a first device (e.g., left hearing instrument) as a master device (i.e., master) and designating a second device (e.g., right hearing instrument) as a slave device (i.e., slave). In other words, a frame can include a number (N) of data packets (e.g., audio samples) transmitted by the master and/or slave. The devices may be designated master or slave by a factory setting. For example, hearing instruments grouped (e.g., sold) in pairs may include settings so that one hearing instrument always begins communication as the master.

The method further includes transmitting 620 a protocol packet (e.g., preamble packet, sync packet, message packet, CRC packet) from the master to the slave. For example, the left hearing instrument may be designated as the master and can begin a frame by transmitting a sync packet to the right hearing instrument. The sync packet can include synchronization data and a payload (e.g., audio sample). The data stream may be delayed according to the time taken to transmit the synchronization data. The delay may be relative to a desired transmission rate of data packets, which in turn, may be related to a sample rate of the audio data at the hearing aid.

The method further includes transmitting 630 a number of data packets between the master and slave in alternating fashion. In other words, the master and slave may alternate transmitting data packets for a pre-determined number of data packets. The data packets may be smaller (e.g., have a smaller number of bits) than the protocol packet. A transmission rate of the data packets may be made slightly higher than the desired transmission rate so that the delay created by the preamble packet can be compensated for by the data packets. In other words, a latency added by the protocol packet can be compensated for by the data packets transmitted after the protocol packet. In other words, the transmission rate of the data packets may deviate from the desired transmission rate during the frame, slower for protocol packets and faster for data packets, but on average is approximately (i.e., within a percent) of the desired transmission rate of data packets for each frame. Accordingly, the number of data packets may be based on a size of the preamble data.

The transmission of the protocol packets may occur at intervals (i.e., regular intervals) for a first portion (e.g., first half) of the frame. Accordingly, the process of transmitting protocol packets followed by transmitting data packets may repeat until all protocol packets for the master have been transmitted (i.e., until the first portion of the frame is complete 640).

The shorter data packets transmitted between the master and slave can each partially compensate for the delay caused by the longer protocol packet. Distributing the protocol packets between periods of transmitting data packets helps to minimize the latency of the communication because the average transmission of the payload data is always kept close to a desired transmission rate (e.g., close to the sample rate). The number of data packets transmitted between each protocol packet in a frame may be the same or may vary. If each protocol packet (i.e., preamble packet, message packet) is the same size, then the number of data packets transmitted in the intervals between protocol packets may be the same.

When transmission of the first portion of the frame is complete, then the method 600 includes transmitting a protocol packets form the slave to the master at regular intervals in a second portion (e.g., second half) of the frame. During the second portion, the method further includes transmitting 660 data packets between the master and the slave in alternating fashion in the (regular) intervals between the protocol packets. This process can continue until the second portion of the frame is complete 620.

When the second portion of the frame is complete 620, the method includes beginning 690 a new frame and repeating the process described above for the next frame. The frame length can be made longer or shorter as needed for different applications. For example, because the protocol operates on a sample-by-sample basis, the frame length is not determined by a minimum payload size.

The method shown in FIG. 6 assumes the devices are synchronized. For synchronization between two devices, a first device may repeatedly transmit a sync word to a second device. The second device is expecting the sync word and can adjust its receiver until the sync word is properly received. After the adjustments are made, the second device may transmit an acknowledgment to the first device that communication, such as shown in FIG. 6, can begin. Details of a possible synchronization phase (i.e., start-up mode) to start the communication are described below.

Figure 7:
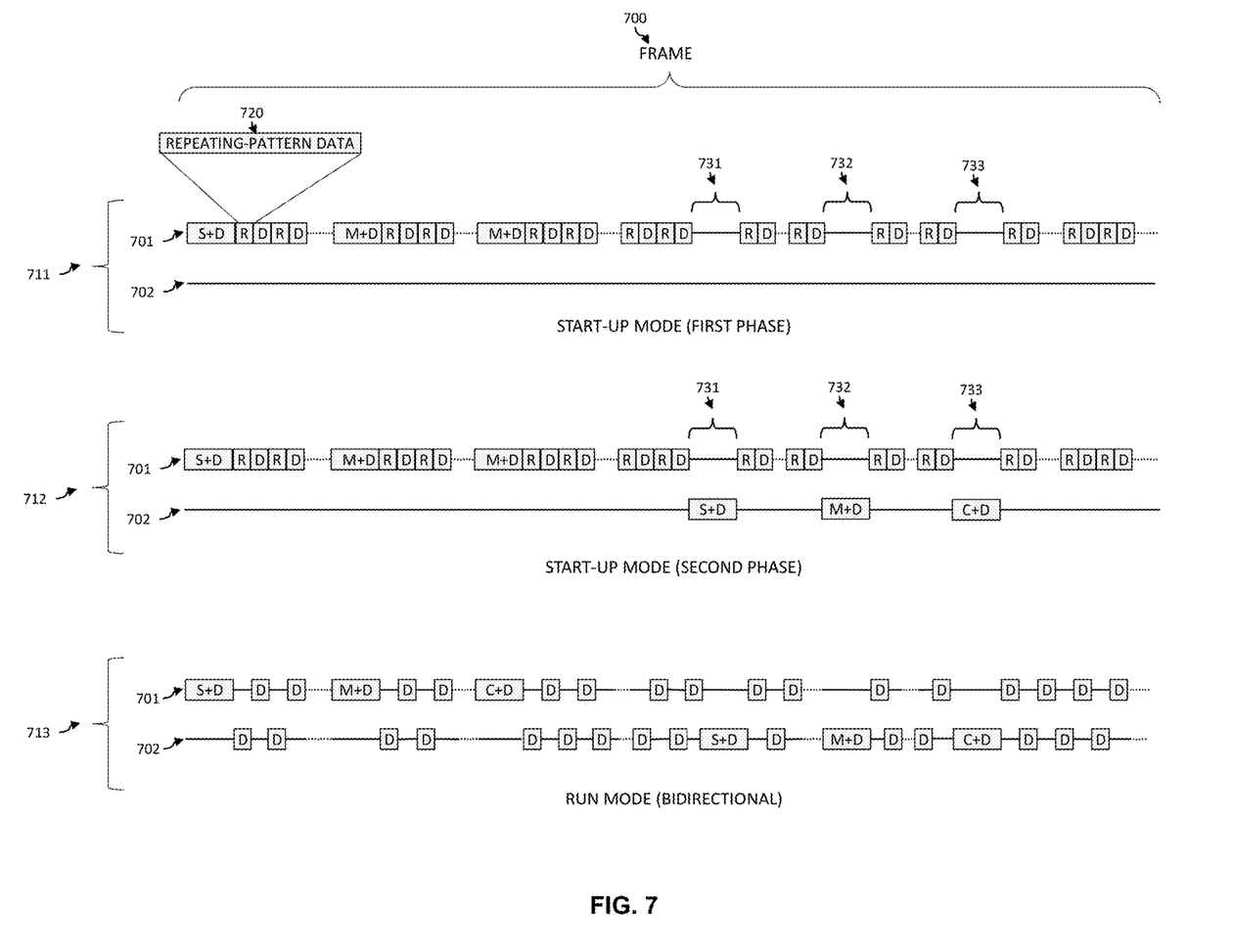
FIG. 7 illustrates a frame of packet transmissions from a master and a slave for various phases of the wireless communication protocol according to a possible implementation of the present disclosure.

FIG. 7 illustrates a frame of uplink and downlink data streams for various phases of the low-latency wireless communication protocol according to a possible implementation of the present disclosure. As mentioned, the communication between two devices can be synchronized prior to communication. Accordingly, the communication protocol may include a start-up mode for synchronization and a run mode for communication. The start-up mode may include a first phase and a second phase, while the run mode may include a bidirectional mode or a unidirectional mode.

The details of these modes can be described with reference to FIG. 7. FIG. 7 illustrates a frame 700 of a downlink data stream of packets transmitted by a first hearing instrument designated as a master (i.e., master device 701) and an uplink data stream of packets transmitted by a second hearing instrument designated as a slave (i.e., slave device 702) and for a first phase of a start-up mode (i.e., first phase 711), for a second phase of a start-up mode (i.e., second phase 712), and for a run mode 713.

In the first phase 711 of the start-up mode, the master device 701 is configured to transmit packets while the slave device 702 is configured to not transmit (i.e., listen). The transmitted packets include protocol packets (i.e., S+D, M+D) that protocol information (e.g., sync word, messages, CRC data, etc.) and a payload of audio data (e.g., one or more audio samples). The transmitted packets further include (shorter) data packets (i.e., D) that only include audio data. In a first portion (e.g., first half) of the frame 700, the protocol packets are spaced at intervals (e.g., regular intervals) with the data packets in between. The communication is similar to that shown in FIG. 5, however, timeslots provide for the slave device 702 are filled instead with repeating-pattern data 720 (i.e., repetitive-pattern data). For example, the repeating-pattern data packets (i.e., R) can include a binary pattern. The binary pattern can contain 50% zeros and 50% ones. The ones and zeros can be in any sequence, such as a repeating one-zero-one binary pattern (i.e., . . . 1010 . . . ). The slave device can acquire a phase and frequency lock (i.e., synchronize) on the transmitted data. The frame of the first phase 711 may be repeatedly transmitted to allow the slave to synchronize. In a second portion (e.g., second half) of the frame 700, the master 701 stops transmitting for one or more listening periods. For example, the second portion of the frame 700 may include a first listening period 731, a second listening period 732, and a third listening period 733. The listening periods provide times for the slave to respond with its own protocol packets. The slave device may response after it has synchronized.

In the second phase 712 of the start-up mode, the slave has synchronized and transmits protocol packets during the listening periods. For example the slave may transmit its sync packet (S+D) during the first listening period 731, a first message packet (M+D) during the second listening period 732, and a second message packet (e.g., a CRC packet (C+D)) during the third listening period 733. These protocol packets sent by the slave inform the master that it has synchronized. As a result, the master synchronizes with the slave by using the slave's sync packet (S+D). After the master synchronizes (e.g., receives the sync word correctly), the master may communicate its sync status to the slave via message packets.

After both the master and the slave synchronize, the communication may enter a run mode 713. The run mode 713 may be bidirectional or unidirectional. For example, a bidirectional run mode is shown in FIG. 7. In this mode, the master 701 and the slave 702 communicate protocol packets (S+D, M+D, C+D) and data packets (D) as described for FIG. 5. In a unidirectional run mode (not shown), the master can transmit exclusively while the slave receives. Alternatively, the slave 702 can transmit exclusively while the master 701 receives.

The latency of the wireless communication protocol is low because a payload of the data packets (D) can be small. Each packet can include one sample of audio so that each sample is transmitted individually on a sample-by-sample bases to reduce a latency in the communication of the samples. For example, packets can be created on a sample-by-sample basis at a hearing instrument. The latency (i.e., communication delay) of the wireless communication protocol is also low (e.g., ≤3 sample periods, <125 μsec) because delays caused by transmitting protocol data (e.g., preamble data, synchronization data, messages, CRC data, etc.) can be compensated for by increasing a packet-transmission rate of data packets so that the latency caused by the protocol data is low (e.g., zero). The latency of the wireless communication protocol is also low because there is no resending of packets. Parity bits are included with each data packet so if a data packet is corrupted it can be repaired. If it is lost, then its loss is not significant to the entire data stream. The latency of the wireless communication protocol is also low because the protocol data can be kept small (e.g., 16 bits) because a binaural application may reduce the scope of the information necessary to carry out communication. For at least these reasons the latency may be referred to as low compared to other wireless protocols (e.g., Bluetooth, WiFi, UWB, etc.). For example, the latency of the protocol described here may be on the order of microseconds (e.g., 125 μs (3 samples) for a 24 kHz sampling rate) rather than milliseconds.

In the specification and/or figures, typical embodiments have been disclosed. The present disclosure is not limited to such exemplary embodiments. For example, while NFMI has been described it is possible that the low-latency protocol described herein could be used with other wireless technologies, such as those that require propagating RF signals.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. Ranges may be expressed herein as from "about" one particular value, and/or to "about" another particular value. When such a range is expressed, an aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A method for wireless communication between two devices, the method comprising:
designating a first device as a master and a second device as a slave, wherein the master and the slave communicate data over a frame by:
transmitting protocol packets from the master to the slave at regular intervals in a first half of the frame and from the slave to the master at regular intervals in a second half of the frame, each protocol packet adding a latency to the wireless communication;
during the regular intervals between the protocol packets, transmitting data packets between the master and the slave in an alternating fashion, the data packets having a number of bits smaller than a number of bits of the protocol packets so that the latency added by each protocol packet is compensated for by the data packets transmitted between the protocol packets.

2. The method for wireless communication between two devices according to claim 1, wherein the two devices are a left hearing instrument and a right hearing instrument.

3. The method for wireless communication between two devices according to claim 1, wherein:
each protocol packet includes protocol data, audio data, and parity data;
each data packet includes audio data and parity data; and
the latency added by each protocol packet corresponds to a time necessary to transmit the protocol data.

4. The method for wireless communication between two devices according to claim 3, wherein:
the protocol data is preamble data, synchronization data, message data, or cyclic redundancy check (CRC) data; and
the audio data is a sample of an audio signal.

5. The method for wireless communication between two devices according to claim 3, wherein the protocol data is 16 bits.

6. The method for wireless communication between two devices according to claim 5, wherein the latency is less than 200 microseconds.

7. The method for wireless communication between two devices according to claim 5, wherein a number of data packets transmitted during the regular intervals between the protocol packets and a packet transmission rate of the data packets during the regular intervals between the protocol packets offset the latency added by each protocol packet.

8. The method for wireless communication between two devices according to claim 3, wherein the audio data is encoded.

9. The method for wireless communication between two devices according to claim 1, wherein the master and the slave communicate data using near field magnetic induction (NFMI).

10. The method for wireless communication between two devices according to claim 1, wherein each protocol packet and each data packet includes one sample of audio so that each sample is transmitted individually on a sample-by-sample basis to reduce the latency in the wireless communication.

11. The method for wireless communication between two devices according to claim 1, further comprising:
synchronizing the wireless communication between the master and the slave, wherein the synchronizing includes:
transmitting, at the master, protocol packets at regular intervals in a first half of a start-up frame; and
during the regular intervals between protocol packets transmitting data packets and repeating-pattern data packets in alternating fashion.

12. The method for wireless communication between two devices according to claim 11, further comprising:

listening, at the master, for protocol packets from the slave at regular intervals in a second half of the start-up frame.

\* \* \* \* \*